W. DECKE.
PLATE HOLDER FOR PHOTOGRAPHIC APPARATUS.
APPLICATION FILED JULY 18, 1913.
1,124,306.  Patented Jan. 12, 1915.
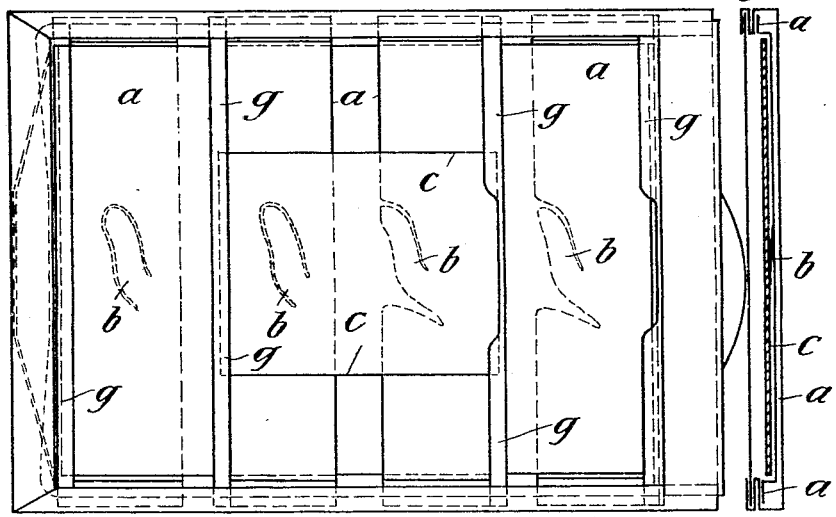
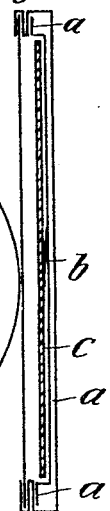
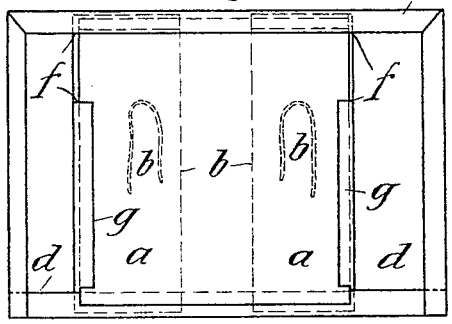
Witnesses:
Charles B Crompton
Fred G. Pohl
W. Decke.
Inventor
by E Broydon Marks
Attorney

UNITED STATES PATENT OFFICE.

WILHELM DECKE, OF PANKOW, NEAR BERLIN, GERMANY.

PLATE-HOLDER FOR PHOTOGRAPHIC APPARATUS.

1,124,306. Specification of Letters Patent. Patented Jan. 12, 1915.

Application filed July 18, 1913. Serial No. 779,775.

*To all whom it may concern:*

Be it known that I, WILHELM DECKE, a citizen of the German Empire, and residing at Pankow, near Berlin, Germany, have invented a certain new and useful Improved Plate-Holder for Photographic Apparatus, of which the following is a specification.

My invention relates to plate-holders for photographic dark-slides or other receptacles for the photographic plate, and a primary object is to provide a plate-holder which is adapted to hold any desired size of photographic plate.

I employ for my plate-holder two holding members, e. g. plates, for holding the photographic plate, which are displaceable relative to each other.

Plate-holders comprising such holding plates are known *per se*, but the latter have always been arranged to be slidable in special inserted guides or strips.

According to my invention, however, the holding plates are guided in the grooves of the dark-slide or other receptacle for the photographic plate, and so secured therein by considerable friction that it is impossible for them to be unintentionally displaced.

Two illustrative embodiments of my invention are diagrammatically represented by way of example in the accompanying drawing, wherein:—

Figure 1 is a side elevation of a darkslide showing the holding plates in two different positions, Fig. 2 is a horizontal section, the holding plates being shown only in the position in which they receive the larger photographic plate, Fig. 3 is a vertical section, and Fig. 4 is a side elevation of such a receptacle for the photographic plate as is employed in magazine cameras.

Referring first to Figs. 1 to 3, two holding plates $a$ each having resilient tongues $b$ are arranged to slide in an ordinary darkslide in such manner that owing to friction against the edges of the dark-slide, the holding plates can be set at desired distances from each other. One longitudinal edge $g$ of each holding plate is a returned edge and so forms a groove. The tongues $b$ press the photographic plate $c$ against the grooved edges $g$ of the holding plates and so hold it fast. When, as shown in Fig. 4, the holding plates are employed in the receptacle $h$ which receives the photographic plate in magazine cameras, that edge $d$ of this receptacle which is left open for the insertion of the photographic plate is made a returned edge, so forming a groove wherein the holding plate of corresponding size can be slid. The photographic plate is pushed over this grooved portion of the receptacle and is then slid in the grooved edges $g$ of the holding plates and finally under the grooved edge $h$ at the farther end of the receptacle. A portion $f$ of the grooved edge $g$ of the holding plates $a$ is cut away to enable the photographic plate to be grasped and drawn out.

I claim:—

1. In photographic apparatus, the combination with a frame having two opposite grooves, of a pair of holding plates forming a plate holder slidable in the grooves, having returned edges for holding the photographic plate and having resilient means adapted to react with the photographic plate for clamping said holding plates in said position in the said grooves merely by friction.

2. In photographic apparatus, the combination with a frame having two opposite grooves, of a pair of holding plates slidable in the grooves, having returned edges for holding the photographic plate and having resilient tongues adapted to press against the photographic plate when held by the holding plates.

In testimony whereof, I affix my signature in the presence of two witnesses.

WILHELM DECKE.

Witnesses:
 HENRY HASPER,
 WOLDEMAR HAUPT.

Copies of this patent may be obtained for five cents each, by addressing the "Commissioner of Patents, Washington, D. C."